(12) United States Patent
Agostini

(10) Patent No.: US 6,481,892 B1
(45) Date of Patent: Nov. 19, 2002

(54) REMOTE CONTROL CABLE

(75) Inventor: Jacques Agostini, Montgeron (FR)

(73) Assignee: Construction Brevetees d'Alfortville - CBA, Alfortville (FR)

( * ) Notice: Subject to any disclaimer, the term of this patent is extended or adjusted under 35 U.S.C. 154(b) by 0 days.

(21) Appl. No.: 09/701,408

(22) PCT Filed: May 28, 1999

(86) PCT No.: PCT/FR99/01262

§ 371 (c)(1),
(2), (4) Date: Nov. 28, 2000

(87) PCT Pub. No.: WO99/63238

PCT Pub. Date: Dec. 9, 1999

(30) Foreign Application Priority Data

May 29, 1998  (FR) ............................................. 98 06820

(51) Int. Cl.⁷ .............................. F16C 29/06; F16C 1/08
(52) U.S. Cl. ............................... 384/43; 74/502; 74/503
(58) Field of Search ........................... 384/43, 44, 45, 384/49; 74/502, 502.3, 503

(56) References Cited

U.S. PATENT DOCUMENTS

| | | | | |
|---|---|---|---|---|
| 3,280,652 A | * | 10/1966 | Eckhardt .................... | 74/502.3 |
| 3,298,243 A | | 1/1967 | Geissler et al. ............. | 74/50 R |
| 3,344,682 A | * | 10/1967 | Bratz ........................ | 74/502.3 |
| 4,188,835 A | * | 2/1980 | Ion ........................... | 74/502.3 |
| 4,238,973 A | | 12/1980 | Polo et al. | |
| 5,184,898 A | | 2/1993 | Kito ............................ | 384/43 |
| 5,722,301 A | * | 3/1998 | Schaaphok ................. | 74/502.3 |

FOREIGN PATENT DOCUMENTS

| EP | 0 826 891 A | 3/1998 |
|---|---|---|
| FR | 2 454 014 A | 11/1980 |
| GB | 514 771 A | 11/1939 |

* cited by examiner

Primary Examiner—Thomas R. Hannon
(74) Attorney, Agent, or Firm—Weingarten, Schurgin, Gagnebin & Lebovici LLP

(57) ABSTRACT

A remote control cable (C) comprising a central core that moves axially while being guided in a sheath (5) by rolling and sliding members between first and second diametrically opposite rails, and an outlet rod (A) connected to each of the ends of said core and sliding inside a respective sheath endpiece (B).

The cable is characterized in that the sheath endpiece (B) includes between its inner face and the outer surface of the outlet rod (A), axial guidance (20) for guiding said rod and for reducing radial friction between the rod (A) and the endpiece (B); the axial guidance (20) for the outlet rod (A) including at least one ring (20) of length that is sufficient to provide axial guidance of the rod relative to the endpiece (B).

The ring (20) is made up of two coaxial cylindrical elements, an inner element (30) and an outer element (40) defining between them cages (14) in which trains of balls (10) are enclosed, the cages (14) comprising at least one cavity (15) opening out at least in part into the inner surface (32) of the inner cylindrical element (30) so as to enable rotary contact between said balls (10) and the rod (A).

Balls one disposed between the inner wall of the endpiece (B) and the outer surface of the rod (A) in such a manner as to be capable of coming into rotary contact with the outer surface of the rod (A).

10 Claims, 1 Drawing Sheet

REMOTE CONTROL CABLE

The present invention relates to a remote control cable.

Mechanical control cables already exist which comprise a central flat-wire core that moves axially while being guided in a sheath by rolling members, such as balls, between a first rail and a second rail that are diametrically opposite. Both ends of the cable include respective endpieces crimped onto the sheath that covers the cable itself. A rod serving to connect the central core of the cable to a control member passes through each endpiece of the sheath. This rod is fixed to the core and is suitable for sliding inside the endpiece so as to transmit a traction or compression force to the central core of the cable.

The axes of the rod and of the endpiece are not in perfect alignment which gives rise to radial friction between the outside face of the rod and the inside face of the endpiece. It can even happen that the rod jams inside the endpiece thus making use of the control cable impossible. The resulting friction makes force transmission less easy, it gives rise to a drop in the overall efficiency of the cable, and it accelerates wear thereof. In general, prior art solutions for bringing the axes of the rod and the central core into alignment give unsatisfactory results both from the point of view of sliding (efficiency) and from the point of view diametral clearance.

In certain applications, in particular in aviation, the main members (flaps, rotors, blades, . . . ) are controlled by complex mechanical systems having links and cranks, and which are also very heavy and rigid.

Traditional control cables are lighter in weight and less bulky but unfortunately cannot be used to replace such mechanical systems.

In most cases, controls are actuated by means of contactors (pedals, levers, . . . ) that apply a radial force on the end of the rod of the cable.

Unfortunately, such a radial force gives rise to harmful friction that can cause the rod to become jammed in the endpiece and can lead to a breakdown in the control of the member involved.

Furthermore, some such members are designed to be controlled, at least temporarily, by an automatic pilot.

Unlike a manual operator, an automatic pilot is not capable of responding to stiffness due to friction in the endpiece because of its very high level of sensitivity required by essential safety measures.

Furthermore, ball bushings of the kind described in FR 2 454 014 or U.S. Pat. No. 5,184,898 are always used in linear guidance applications where actuating forces are directed axially and not radially relative to the moving rod.

The present invention sets out to resolve the technical problems posed by the prior art.

This object is achieved by means of a remote control cable comprising in particular a central core that moves axially while being guided in a sheath by rolling and sliding members between first and second diametrically opposite rails, and an outlet rod connected to each of the ends of said core and sliding inside a respective sheath endpiece.

The cable is characterized in that the sheath endpiece includes between its inner face and the outer surface of the rod, axial guidance means for guiding the rod and means for reducing radial friction between the rod and the endpiece. In addition, the axial guidance means for the rod include at least one ring of length that is sufficient to provide axial guidance of the rod relative to the endpiece; said ring being made up of two coaxial cylindrical elements, namely an inner element and an outer element, defining between them cages in which trains of balls are enclosed. The cages comprise at least one cavity opening out at least in part into the inner surface of the inner cylindrical element so as to enable rotary contact between the balls and the rod. The means for reducing friction comprise balls disposed between the inner wall of the endpiece and the outer surface of the rod in such a manner as to be capable of coming into rotary contact with the outer surface of the rod.

The device of the present invention makes it possible simultaneously to guide the rod axially and to obtain a significant reduction in radial and axial friction, thereby avoiding any jamming of the rod and increasing overall efficiency of the remote control cable. In addition, in this case, the endpiece serves to convert a radial force into rolling, and thus into axial movement of the rod.

The ring fitted with balls is a single element constituting the axial guidance means and the means for reducing axial and radial friction. In addition, such a ring is easy to handle and to insert into the endpiece of the sheath.

Preferably, the cages form guide paths enabling the balls to circulate. The balls are thus simultaneously in rotary contact with the outside surface of the rod and in displacement inside the cage. Friction is thus considerably reduced. The risks of the balls jamming inside the cages is thus greatly reduced.

Preferably, the cages form oblong closed loops. The stroke of the balls is thus unlimited. The contact area between the balls and the outside surface of the rod is increased, thereby providing better axial guidance of the rod and further reducing radial friction.

In a particular embodiment, the cavities of the cages open out to the inner face of the inner cylindrical element to form open loop orifices, the complementary non-open portions closing in complementary manner the open loops of the orifices.

Preferably, the outer cylindrical element of the ring includes slots communicating with the cages and allowing surface portions of the balls to pass therethrough. The balls which are not in contact with the surface of the rod can thus move freely, thereby avoiding any risk of the balls jamming in the cage. The ability of the balls to roll against the inside face of the endpiece makes it easy to insert or withdraw the ring.

Advantageously, the slots coincide in projection with the non-open complementary portions of the cavities of the cages. This configuration is particularly suitable for obtaining a rolling area that is relatively large. The slots make it possible to avoid any risk of the balls jamming.

Preferably, the ring is fitted with an annular sealing gasket for protecting the cages from the outside environment. In this way, dust or other impurities cannot penetrate into the ring and therefore cannot impede circulation of the balls or give rise to undesirable friction.

The outer cylindrical element may have a channel for feeding the cages with lubricant. Lubricating the balls improves the lifetime of the ring.

Preferably, the cable has two rings juxtaposed inside the endpiece. The surface area provided by two juxtaposed rings guarantees a rolling area that is sufficient to be effective against friction and provides excellent axial guidance for the rod.

The present invention will be better understood on reading the following description of an embodiment given by way of non-limiting example and accompanied by the drawing, in which.

Figure 1:
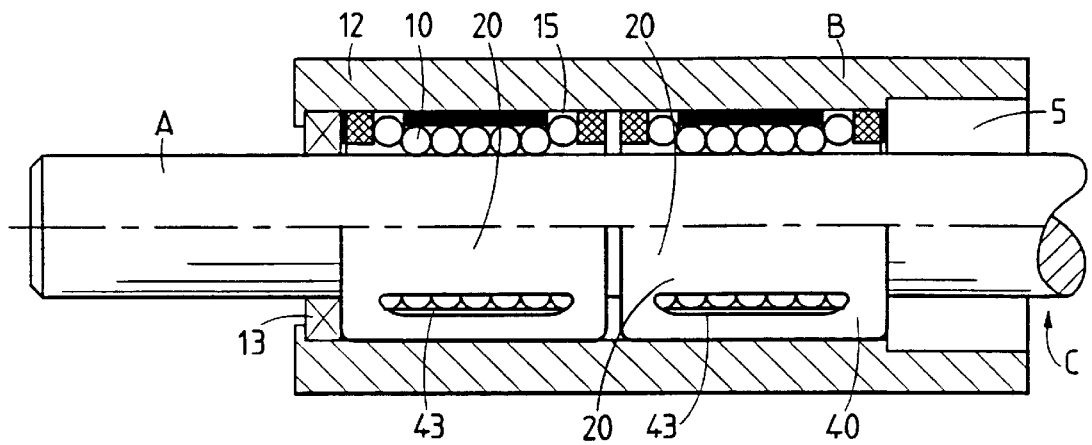
FIG. 1 shows a particular embodiment of the present invention.

As shown in FIG. 1, the moving and sliding rod A passes through the sheath endpiece B. The sheath endpiece B is fixed to the sheath 5 of the cable C. Between the inside surface of the endpiece B and the outside surface of the rod A there are disposed trains of balls 10 which are suitable for coming into rotary contact with the surface of the rod A. The trains of balls 10 are disposed over a length that is sufficient for the presence of the balls 10 to transform friction into rolling and to provide axial guidance of the rod A. The trains of balls 10 are preferably placed close to the end 12 of the endpiece B so as to effective in preventing any risk of the rod jamming against the surface of the endpiece.

A sealing ring 13 is disposed close to the end 12 of the endpiece B.

In this preferred embodiment of the present invention, the trains of balls 10 are contained between two coaxial cylindrical elements 30 and 40, constituting an inner and an outer element respectively which, when assembled together, form a ring 20. In the preferred embodiment shown in FIG. 1, two rings are juxtaposed inside the endpiece.

The trains of balls 10 disposed in each of the rings 20 are suitable for coming into rotary contact with the outside surface of the rod A and also for moving inside cages 14 formed between the two coaxial elements 30 and 40, thereby further reducing radial and axial friction.

By disposing two rings end to end, it is possible to obtain a rolling surface of area that is sufficiently large to be effective and to provide good axial guidance of the rod A. Nevertheless, the number of rings in the endpiece is not limited to two.

A sealing ring 13 is preferably disposed at the end 12 of the endpiece B so as to prevent any dust or impurity from penetrating into the endpiece and giving rise to additional friction, and thus increased wear of the balls 10 and of the ring 20, or impeding circulation of the balls 10.

The sealing ring can also be secured to the ring 20 close to the end 12 of the endpiece B.

A sealing ring provided with one or two lips that are properly oriented relative to the opening of the endpiece can be entirely suitable.

Figure 2:
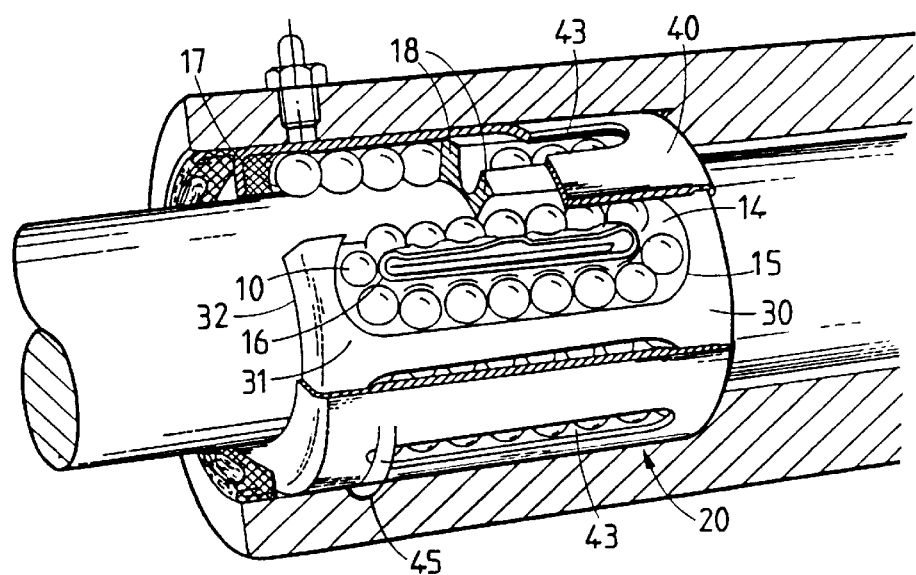
FIG. 2 shows one of the rings of the present invention in greater detail.

FIG. 2 shows the ring 20 housing the trains of balls 10 in greater detail. The ring comprises an inner cylindrical element 30 and an outer cylindrical element 40, with the two elements 30 and 40 being coaxial. The outer cylindrical element 40 can be made of sheet metal or any other material having sufficient strength.

The trains of balls 10 are housed in at least one cage 14 formed in part by a cavity 15 in the inner cylindrical element 30. This cavity 15 can form a more or less elongate closed loop and can open out fully into the outer face 31 of the inner cylindrical element 30. The cavity 15 opens out partially into the inner face 32 of the inner cylindrical element 30 so as to allow the balls to come into rotary contact with the outer face of the rod A.

An insert 16 is placed in the center of the cage 14 and can either be a separate piece or can be formed integrally with the inner element 30 by molding. By way of example, the inner element 30 can be made out of a thermoplastic material. The insert 16 is preferably made of a material that is sufficiently elastic to be capable of deforming and holding the balls 10 elastically inside the cage 14 without impeding their circulation.

The cavity 15 of the cage 14 preferably opens out to the inner surface 32 of the cylindrical element 30 so as to form an open loop orifice 17 in said surface. The portion 18 of the cavity 15 that does not open out to the inner face of the inner cylindrical element 30 thus forms a complementary and substantially rectilinear portion of the orifice 17 closing the open loop.

Substantially rectilinear slots 43 are formed in the outer cylindrical element 40. The position of each slot 43 coincides in projection with the position of the non-open portion 18 of the cavity 15. These slots 43 are parallel to the non-open portions 18 and also parallel to the generator lines of the ring 20. The balls 10 can project in part through the slot 43 when they are situated on the substantially rectilinear portion 18, thus facilitating circulation thereof.

The channel 45 for feeding lubricant to the balls 10 is preferably placed close to the end 12 of the endpiece B so as to be easily accessible, and it can be formed on the inner surface of the outer cylindrical element 40.

Other slots could also be provided facing the open portion 17. It is also possible to provide sufficient space between the cylindrical elements 30 and 40 to be able to avoid having slots 43 present.

What is claimed is:

1. A remote control cable (C) comprising a central core that moves axially while being guided in a sheath by rolling and sliding members between first and second diametrically opposite rails, and an outlet rod (A) connected to each of the ends of said core and sliding inside a respective sheath endpiece (B), the cable being characterized in that said sheath endpiece (B) includes between its inner face and the outer surface of said outlet rod (A), at least one ring serving both to convert radial forces into axial movement, and to guide said rod axially relative to said endpiece (B);

said ring being made up of two coaxial cylindrical elements, an inner element and an outer element defining between them cages in which trains of balls are enclosed, said cages comprising at least one cavity opening out at least in part into the inner surface of said inner cylindrical element so as to enable rotary contact between said balls and the outer surface of the rod (A) in such a manner as to reduce friction between said rod (A) and the endpiece (B).

2. A remote control cable (C) according to claim 1, characterized in that said cages form guide paths enabling said balls to circulate.

3. A remote control cable (C) according to claim 2, characterized in that:

said cages form oblong closed loops;

said cavities of said cages open out to the inner face of said inner cylindrical element to form open loop orifices, the complementary non-open portions closing in complementary manner the open loops of said orifices;

said outer cylindrical element of said ring includes slots communicating with said cages and allowing surface portions of said balls to pass therethrough;

said slots coincide in projection with said non-open complementary portions of said cavities of said cages;

said ring is fitted with an annular sealing gasket for protecting said cages from the outside environment;

said outer cylindrical element has a channel for feeding said cages with lubricant;

the cable includes two juxtaposed rings.

4. A remote control cable (C) according to claim 1, characterized in that said cages form oblong closed loops.

5. A remote control cable (C) according to claim 1, characterized in that said cavities of said cages open out to the inner face of said inner cylindrical element to form open loop orifices, the complementary non-open portions closing in complementary manner the open loops of said orifices.

6. A remote control cable (C) according to claim 1, characterized in that said outer cylindrical element of said ring includes slots communicating with said cages and allowing surface portions of said balls to pass therethrough.

7. A remote control cable (C) according to claim 6, characterized in that said slots coincide in projection with said non-open complementary portions of said cavities of said cages.

8. A remote control cable (C) according to any claim 1, characterized in that said ring is fitted with an annular sealing gasket for protecting said cages from the outside environment.

9. A remote control cable (C) according to claim 1, characterized in that said outer cylindrical element has a channel for feeding said cages with lubricant.

10. A remote control cable (C) according to claim 1, characterized in that it includes two juxtaposed rings.

* * * * *

UNITED STATES PATENT AND TRADEMARK OFFICE
CERTIFICATE OF CORRECTION

PATENT NO.      : 6,481,892 B1                                      Page 1 of 1
DATED           : November 19, 2002
INVENTOR(S)     : Jacques Agostini It is certified that error appears in the above-identified patent and that said Letters Patent is hereby corrected as shown below:

<u>Title page,</u>
Item [73], Assignee, "Construction Brevetees d'Alfortville-CBA" should read:
-- Constructions Brevetees d'Alfortville-CBA --; and
Item [57], ABSTRACT,
Line 22, "Balls one" should read -- Balls (10) --.

Signed and Sealed this

Eighth Day of June, 2004

JON W. DUDAS
*Acting Director of the United States Patent and Trademark Office*